United States Patent Office 2,901,258
Patented Aug. 25, 1959

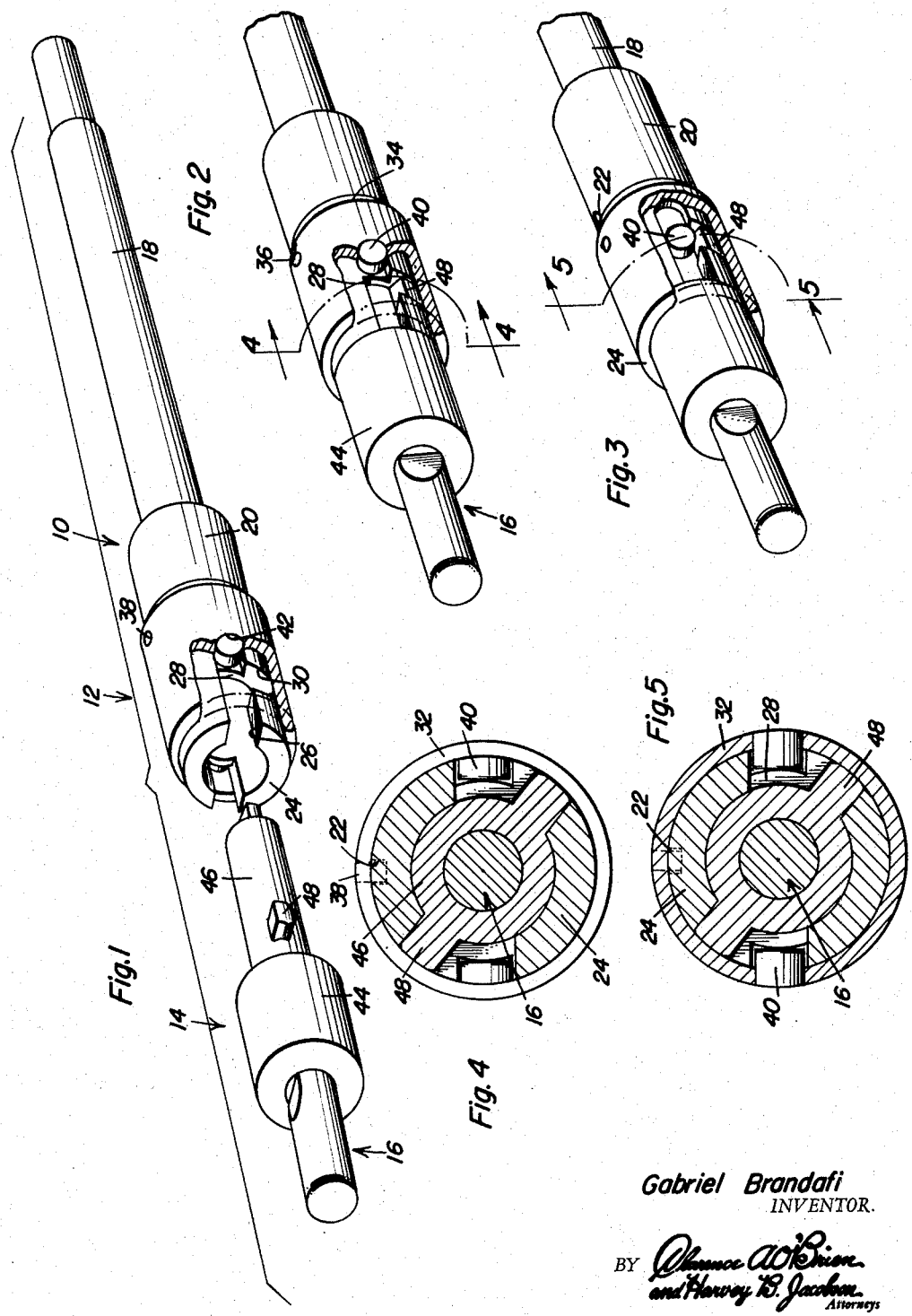

2,901,258

DRILL PRESS SPINDLE

Gabriel Brandafi, Riegelsville, Pa.

Application September 30, 1957, Serial No. 687,242

3 Claims. (Cl. 279—97)

This invention relates generally to a drill press spindle and more specifically to a quick change drill press spindle.

In the machinist art, when men are being paid on piece rate, the operators are in the habit of changing drills before the drill spindle has come to a stop. This is dangerous, since on conventional drill spindles there are many projections and quite often operators will injure themselves because of bodily contact with these projections. Therefore, the primary object of this invention is to provide an improved type of drill press spindle construction wherein the external surface of the spindle will be smooth and free of projections, and so prevent injury to operators grasping the spindles while they are turning.

Another object of this invention is to provide a drill press spindle construction which has only three parts, so that damage to any one part, will not cause complete failure of the drill to operate, since the parts are simple and therefore easy to replace.

A further object of this invention is to provide a drill press spindle having means adapting drill chucks for quick and easy removal for insertion into the drill press spindle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective, exploded view illustrating the drill press spindle construction comprising the present invention;

Figure 2 is a perspective view of the device, illustrating one step in the engagement of the drill chuck with the spindle;

Figure 3 is a perspective view illustrating the relation of the parts as they would be used in operation;

Figure 4 is a vertical sectional view taken substantially along the plane defined by reference line 4—4 of Figure 2, illustrating the details of construction thereof; and Figure 5 is a vertical sectional view taken substantially along the plane defined by reference line 5—5 of Figure 3.

Referring now more specifically to the drawings, the numeral 10 generally designates the spindle comprising the present invention. A collar 12 is mounted on the spindle, a drill chuck 14 is engaged with the spindle, and a drill bit 16 is inserted into chuck 14.

Spindle 10 comprises a shaft 18 having a larger diameter, cylindrical portion 20 at one end thereof, which has a longitudinal slot 22 formed therein. A hollow socket portion 24 is formed on the end of cylindrical portion 20. Socket portion 24 has diametrically opposed longitudinally extending slots 26 formed therein, which extend through the thickness of socket portion 24. However, the upper portion of the slot 26, does not extend through the full thickness of the walls of socket portion 24, as can be seen by web 28 in Figure 1. A bayonet slot 30 is formed near the upper portion of slot 26, so as to form a continuous surface with the edge of web 28.

Collar 12 is actually a hollow cyliner 32, having one chamfered edge 34. Near the upper end of cylinder 32, a threaded opening 36 is formed therethrough, for the reception of setscrew 38, which is to be inserted into slot 22, and will therefore limit the longitudinal movement of collar 12, because of the setscrew 38 being locked in slot 22. It is to be noted that setscrew 38 when inserted into slot 22 will be flush with or depend below the outer peripheral surface of cylinder 32, so that no projections will be outstanding from the collar 12. Inwardly extending projections 40 are pressed into diametrically opposed openings 42 formed for the purpose. These projections 40 are of such a length, that when the collar is in position they may be in contact with the outer surface of web 28. As previously mentioned, the slot 22 forms limit stops for setscrew 38, so as to limit the longitudinal movement of collar 12. It is to be noted that the upper limit of collar 12, is the position, when projection 40 is in contact with the face of web 28, and is at the very upper portion of slot 26. The lower position, which is as illustrated in Figure 3, is that position wherein projection 40 is in alignment with bayonet slot 30.

A Morse Taper drill chuck 14 is adapted for engagement with a drill bit 16, which has a similar Morse Taper. As may be seen in Figure 1 the very upper end of the drill bit extends outwardly from the upper end of the drill chuck for a small distance. This is so that the drill bit may be removed by simply tapping on the upper surface of the bit, thus driving it through the drill chuck 14. Drill chuck 14 consists of a larger diameter portion 44 which is of the same diameter as socket portion 24, and a smaller diameter portion 46 which is adapted to be inserted into socket portion 24. Projections 48 extend outwardly from smaller diameter portion 46, at diametrically opposed points. These projections are adapted to be inserted into slot 26, and thence into bayonet slot 30.

In use, the collar 12 would be fixed onto spindle 10, by means of setscrew 38 riding in slot 22. Thus the collar is connected to spindle 10, and it only has a small longitudinal movement thereon. After the drill bit 16 is inserted into the drill chuck 14, the drill chuck, or rather the smaller diameter portion 46 of the chuck, is inserted into socket portion 24, and projections 48 ride into slot 26. The projections 48 come in contact with projections 42, and as the drill chuck is moved upwardly, the collar 12 is also moved upwardly into the position shown in Figure 1, wherein the projection 40 is in contact with web 28. Then, by turning drill chuck 14 clockwise, the projections 48 will ride into bayonet slots 30, and subsequently, because of the force of gravity, collar 12 will fall downwardly to its limited downward position, which is shown in Figure 3, and thus projection 40 will serve to lock projection 48 into place.

The upper part or shaft of the appropriate size drill is run into the Morse Taper and when said drill shaft is completely inserted, about one eighth (⅛) of an inch protrudes through the end of the channel. Said drill holder is then placed into the base of the spindle with the spur running perpendicularly to the base of the spindle until said spur comes into line with its slot. The base is then given a half turn clockwise to rest firmly in said slot, whereupon the collar which is slipped onto the base of the spindle before the Morse Taper part is inserted is brought down over the slot and channel, thus locking the Morse Taper drill holder into the base of the spindle. The top or shaft of the spindle is then fitted into a bearing which in turn is part of the drive or universal assembly.

This invention contains three parts; namely, the Morse Taper drill holder, the spindle, and the collar, whereas the others that are presently being used contain nine or more parts, damage to any one of which would cause a failure of that particular drill to operate. This would be much less expensive, much more durable, less unwieldy, much less complicated, and a great deal safer. The safety feature lies in the fact that inasmuch as the drill holder is locked into the base of the spindle, the drill must be stopped before the drill can be removed and changed, whereas with the use of the present drill spindles, the operators, mostly on piece rate, take the chance of removing the drill while in operation, many times injuring themselves and ripping the clothes right off their bodies. This quick-change spindle has another advantage in the ease of removing the drill by simply tapping that part that protrudes through the channel, whereas the ones now in use are more complicated and require hammering and forcing to remove the drill. The net result of the quick-change spindle operation is that with the safety feature incident to drill stoppage, the drill change can be made faster because of the ease in removing same.

It may thus be seen that I have invented a new and improved type of drill press spindle, wherein piece workers may change drill bits and chucks therefor, quickly and easily, and if they do while the spindle is still moving, they will not be injured, because of the smooth outer contours of the spindle construction.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. An interlocked drill press spindle construction comprising a drill chuck, a drill spindle, and locking collar means therefor, the lower end of said drill spindle having a hollow, cylindrical portion thereon, said cylindrical portion having a bayonet slot formed therethrough, with the major portion thereof disposed in a vertical plane, said bayonet slot having a vertical portion and an offset portion, said drill chuck being inserted into said cylindrical portion, a pin projecting from said drill chuck and disposed in said slot for vertical sliding movement and subsequent angular movement therein whereby the pin may be positioned within the offset portion of the slot, the lower end of said drill chuck having a portion of a greater diameter than the remainder of said drill chuck which defines an enlarged end, the upper edge of said enlarged end being spaced from the pin a distance substantially equal to the distance between the offset portion of the bayonet slot and the lower edge of the cylindrical portion so that the pin is positioned in alignment with the offset portion of the slot when the enlarged end of the drill chuck abuts against the lower edge of the cylindrical portion, said locking collar means being slidably positioned on said cylindrical portion for locking said pin in the offset portion of said bayonet slot.

2. The combination of a drill chuck, a drill spindle, and a locking collar therefor, the lower end of said drill spindle having a hollow, cylindrical portion thereon, said cylindrical portion having a bayonet slot formed therethrough with the major portion thereof disposed in a vertical plane, said drill chuck being inserted into said cylindrical portion, a pin projecting from said drill chuck and disposed in said slot for vertical sliding movement and subsequent angular movement therein whereby the pin may be positioned within the offset portion of the slot, said locking collar disposed about said cylindrical portion for vertical sliding movement thereon, a vertical groove formed in the external surface of said cylindrical portion, a finger on said collar projecting into said groove and limiting the vertical movement of said collar by engagement with said finger against the ends of said groove, the upper peripheral edge of said vertical portion being coextensive with the upper peripheral edge of said offset portion so that the pin is positioned in alignment with the offset portion of the slot when said pin abuts against the upper peripheral edge of the vertical portion of said slot, a shallow notch formed in the outer surface of said cylindrical portion in alignment and communicating with said slot and disposed above the offset portion thereof, a projection extending inwardly of said collar and engaged in said slot, said projection being sufficiently short in length to be engaged in said notch when the drill chuck is inserted in said cylindrical portion, the lower end of said groove being so positioned that said projection will be in horizontal alignment with said pin when the pin is in said offset portion and the finger is engaged with the lower end of said groove thereby locking said drill chuck on said drill spindle.

3. An interlocked drill press spindle construction comprising a drill chuck, a drill spindle, and locking collar means therefor, the lower end of said drill spindle having a hollow, cylindrical portion thereon, said cylindrical portion having a bayonet slot formed therethrough, with the major portion thereof disposed in a vertical plane, said bayonet slot having a vertical portion and an offset portion, said drill chuck being inserted into said cylindrical portion, a pin projecting from said drill chuck and disposed in said slot for vertical sliding movement and subsequent angular movement therein whereby the pin may be positioned within the offset portion of the slot, the lower end of said drill chuck having a portion of a greater diameter than the remainder of said drill chuck which defines an enlarged end, the upper edge of said enlarged end being spaced from the pin a distance substantially equal to the distance between the offset portion of the bayonet slot and the lower edge of the cylindrical portion so that the pin is positioned in alignment with the offset portion of the slot when the enlarged end of the drill chuck abuts against the lower edge of the cylindrical portion, said locking collar disposed about said cylindrical portion for vertical sliding movement thereon, a vertical groove formed in the external surface of said cylindrical portion, a finger on said collar projecting into said groove and limiting the vertical movement of said collar by engagement with said finger against the ends of said groove, the upper peripheral edge of said vertical portion being coextensive with the upper peripheral edge of said offset portion so that the pin is positioned in alignment with the offset portion of the slot when said pin abuts against the upper peripheral edge of the vertical portion of said slot, a shallow notch formed in the outer surface of said cylindrical portion in alignment and communicating with said slot and disposed above the offset portion thereof, a projection extending inwardly of said collar and engaged in said slot, said projection being sufficiently short in length to be engaged in said notch when the drill chuck is inserted in said cylindrical portion, the lower end of said groove being so positioned that said projection will be in horizontal alignment with said pin when the pin is in said offset portion and the finger is engaged with the lower end of said groove thereby locking said drill chuck on said drill spindle.

References Cited in the file of this patent

UNITED STATES PATENTS

| | | |
|---|---|---|
| 1,808,051 | Maslewski | June 2, 1931 |
| 1,871,370 | Jacques | Aug. 9, 1932 |
| 1,885,321 | Benn | Nov. 1, 1932 |
| 2,060,523 | Packer | Nov. 10, 1936 |
| 2,767,992 | Emrick | Oct. 23, 1956 |